United States Patent [19]

Senkus et al.

[11] Patent Number: 5,696,199
[45] Date of Patent: Dec. 9, 1997

[54] PRESSURE-SENSITIVE ADHESIVE POLYACRYLATE POLYMER AND METHOD OF MAKING

[75] Inventors: Raymond Senkus, Stillwater; Chung I. Young, Roseville; Leonard W. Barrett, Maplewood; Ying-Yuh Lu, Woodbury, all of Minn.

[73] Assignee: Minnesota Mining and Manufacturing Company, St. Paul, Minn.

[21] Appl. No.: 685,230

[22] Filed: Jul. 23, 1996

Related U.S. Application Data

[62] Division of Ser. No. 568,625, Dec. 7, 1995.

[51] Int. Cl.$^6$ .................... C09J 133/08; G08L 37/00
[52] U.S. Cl. .................. 524/548; 524/399; 524/432; 524/555; 524/556
[58] Field of Search ................ 526/264, 307.7, 526/318.4, 318.44, 328.5, 329.5, 330; 524/460, 548, 556, 555, 432, 399

[56] References Cited

U.S. PATENT DOCUMENTS

| | | | |
|---|---|---|---|
| 3,691,140 | 9/1972 | Silver | 260/78.5 |
| 3,786,116 | 1/1974 | Milkovich et al. | 260/885 |
| 3,971,373 | 7/1976 | Braun | 128/146.2 |
| 4,000,236 | 12/1976 | Redfarn et al. | 264/112 |
| 4,061,807 | 12/1977 | Shaler et al. | 428/36 |
| 4,166,152 | 8/1979 | Baker et al. | 428/522 |
| 4,220,553 | 9/1980 | Krause | 252/428 |
| 4,296,166 | 10/1981 | Ogino | 428/283 |
| 4,411,948 | 10/1983 | Ogino et al. | 428/283 |
| 4,433,024 | 2/1984 | Eian | 428/198 |
| 4,510,193 | 4/1985 | Blucher et al. | 428/196 |
| 4,531,953 | 7/1985 | Groose et al. | 55/74 |
| 4,536,440 | 8/1985 | Berg | 428/284 |
| 4,664,683 | 5/1987 | Degen et al. | 55/387 |
| 4,665,050 | 5/1987 | Degen et al. | 502/402 |
| 4,677,019 | 6/1987 | von Blucher | 428/244 |
| 4,693,935 | 9/1987 | Mazurek | 428/352 |
| 4,786,696 | 11/1988 | Bohnel | 526/88 |
| 4,833,179 | 5/1989 | Young et al. | 522/183 |
| 4,868,032 | 9/1989 | Eian et al. | 428/198 |
| 4,904,343 | 2/1990 | Giglia et al. | 162/145 |
| 4,952,650 | 8/1990 | Young et al. | 526/194 |
| 4,983,192 | 1/1991 | von Blucher et al. | 55/387 |
| 5,033,465 | 7/1991 | Braun et al. | 128/205.27 |
| 5,045,569 | 9/1991 | Delgado | 521/60 |
| 5,078,132 | 1/1992 | Braun et al. | 128/206.12 |
| 5,124,177 | 6/1992 | Kasmark, Jr. et al. | 427/202 |
| 5,154,960 | 10/1992 | Mucci et al. | 428/68 |
| 5,162,475 | 11/1992 | Tang et al. | 526/333 |
| 5,186,165 | 2/1993 | Swann | 128/201.28 |

(List continued on next page.)

FOREIGN PATENT DOCUMENTS

| | | | |
|---|---|---|---|
| 1 207 736 | 7/1986 | Canada | B01J 20/28 |
| 0 159 696 A2 | 10/1985 | European Pat. Off. | B01J 20/20 |
| WO 91/08037 | 6/1991 | WIPO | B01D 39/00 |
| WO 93/12147 | 6/1993 | WIPO | C08F 2/16 |
| WO 94/13751 | 6/1994 | WIPO | C09J 133/08 |

OTHER PUBLICATIONS

Derwent Publication for Japanese 60 203 683 (Oct. 15, 1985).

3M Product bulletin 70-0701-5436-7(535)BE "Occupational Health and Environmental Safety" (1993).

(List continued on next page.)

*Primary Examiner*—Daniel Zirker
*Attorney, Agent, or Firm*—Karl G. Hanson; William G. Ewert

[57] ABSTRACT

A fluid permeable composite structure having active particulate bonded together using a pressure-sensitive adhesive (PSA) polymer microparticulate. Use of the PSA polymer microparticulate to bond the active particulate together produces a bonded structure that, unlike previously-developed active bonded structures, is flexible and therefore can be conformed into a variety of shapes. The shaped structures may be used as gaseous filters in a wide variety of respirators.

9 Claims, 4 Drawing Sheets

U.S. PATENT DOCUMENTS

| | | | |
|---|---|---|---|
| 5,187,141 | 2/1993 | Jha et al. | 502/432 |
| 5,206,207 | 4/1993 | Tolles | 502/424 |
| 5,248,651 | 9/1993 | Henning et al. | 502/432 |
| 5,254,521 | 10/1993 | Knudson | 502/432 |
| 5,276,000 | 1/1994 | Matthews et al. | 504/424 |
| 5,292,708 | 3/1994 | Karl | 502/427 |
| 5,292,844 | 3/1994 | Young et al. | 526/329.5 |
| 5,304,527 | 4/1994 | Dimitri | 502/425 |
| 5,344,626 | 9/1994 | Abler | 423/210 |
| 5,368,633 | 11/1994 | Foldyna et al. | 95/19 |
| 5,374,698 | 12/1994 | Young et al. | 526/264 |
| 5,624,973 | 4/1997 | Lu et al. | 522/40 |

OTHER PUBLICATIONS

3M Product bulletin 70–0701–5436–7(675)II "Easi–Air™ Dual Cartridge Respirators" (1986).

Scott Aviation Company Product bulletin H/S 5666 Aug. 1993 "Speed–Evac™ Disposable Chemical Cartridge Mouth Bit Respirator".

Kuraray Carbon Co. Product bulletin 8712–1000 "Activated Carbon".

Atochem Inc. Product bulletin "Cecarbon™" (1987).

CECA Inc. Product bulletin "Activated Carbon Applications".

*Kirk–Othmer Encyclopedia of Chemical Technology*, 4th Ed., John E. Wiley & Sons, 1992, vol. 4, "Activated Carbon", pp. 1015–1037.

Ruthven, DM, *Principles of Adsorption and Adsorption Processes*, John Wiley & Sons, 1984, pp. 1–28.

*Kirk–Othmer Encyclopedia of Chemical Technology*, 3rd Ed., John Wiley & Sons, 1982, vol. 18, pp. 742–743.

*Handbook of Pressure Sensitive Adhesive Technology*, Van Nostrand Reinhold, 1989, pp. 261, 295, 306–307, 317–320, 274–379, 396–402.

*Kirk–Othmer Encyclopedia of Polymer Science and Engineering*, vol. 13, 1988, pp. 345–346.

*Ullmann's Encyclopedia of Industrial Chemistry*, 5th Ed., VCH Publishers, vol. 17, 1991, pp. 467–468.

PRESSURE-SENSITIVE ADHESIVE POLYACRYLATE POLYMER AND METHOD OF MAKING

This is a division of application Ser. No. 08/568,625 filed Dec. 7, 1995, pending.

This invention relates to permeable structures containing microporous sorbent particulate bonded with a polymeric binder. In another aspect this invention relates to respirators, such as protective face or gas masks, containing a permeable bed or sheet comprising bonded, microporous, adsorbent particulate. In a still further aspect, this invention relates to pressure-sensitive adhesive (PSA) polymer and particulates or beads thereof and to methods of making and using the PSA.

Many useful products and processes employ active or functional particulate materials that interact with fluids by sorbing (adsorbing or absorbing) components from the fluids. Examples of such products are worker respirators containing microporous sorbents that purify workplace breathing air; other examples are water purification systems, catalyst systems, drug delivery systems, and ion exchange resins.

Activated carbon, an active or functional particulate having sorptive properties, is widely used to filter air to protect persons against a variety of toxic or noxious vapors, including war gases, industrial chemicals, solvents, and odorous compounds. The activated carbon is derived, for example, from coal or coconut shells and can be produced in the form of powders, granules, and shaped products. It is employed in individual canisters or pads, as in gas masks. Important properties of commercial activated carbon products include those related to their particle size as well as their pore structure. (*Kirk-Othmer Encyclopedia of Chemical Technology*, Fourth Ed., John E. Wiley and Sons, 1992, Vol. 4, "Activated Carbon," p. 1015–1037.)

The U.S. Occupational Safety and Health Administration has promulgated "Eleven Commandments" on respirator use for workers who may be exposed to workplace hazards (see 29 Code of Federal Regulations, Part 1910. 134 (b), Requirements of a minimal respirator program). Some commercial respirator products approved under such requirements are described, for example, in product bulletins 70-0701-5436-7(535)BE and 70-0701-5436-7(675)11 of the 3M Company and HIS 5666 8/93 of Scott Aviation Company.

U.S. Pat. No. 5,078,132 (Braun et al.) describes a respirator having a porous bonded structure that contains spaced adsorbent granules, that are bonded to one another by certain adherent binder particles, including those of polyurethane. U.S. Pat. Nos. 4,061,807 (Shaler et al.) and 4,664,683 (Degen et al.), cited as references in U.S. Pat. No. 5,078,132, describe self-sustaining or self-supporting porous adsorbent bodies or structures made from a mixture of adsorbent granules or particles, such as activated carbon, bonded together or immobilized by certain particulate organic polymer binder, such as acrylics.

In addition to activated carbon, there are other porous sorbent structures that are useful for separating components in gas and liquid streams or for purifying such streams. Examples of other porous sorbent structures include silica gel (a material that appears first to have been developed during the First World War for use in gas masks) and activated alumina (which proved to be superior to silica gel in such gas masks). Other sorbents are the crystalline aluminosilicates or zeolites and molecular sieve adsorbents (formed into macroporous pellets). (Ruthyen, D. M., *Principles of Adsorption and Adsorption Processes*, John Wiley and Sons, 1984, pp. 1–28.)

In many industrial adsorption processes the adsorbent is contacted by the fluid phase in a packed column. Such variables as the particle size, fluid velocity, and bed dimensions affect pressure drop and have an important impact on the processes economics. (Ruthven, supra, p 206.)

Active particles also have been incorporated into fabrics to produce sheets containing the particles. U.S. Pat. No. 3,971,373 (Braun) describes a self-supporting, durable, flexible, conformable, low-pressure-drop, porous, sheet product comprising a web of melt-blown microfibers loaded with particles, such as activated carbon particles. U.S. Pat. Nos. 4,433,024 (Eian), and 4,868,032 (Eian et al.) describe fibrous webs of melt-blown fibers and sorbent particles dispersed therein. U.S. Pat. No. 4,677,019 (von Blücher) describes a process where an aqueous suspension of particles—e.g., activated carbon, and liquid polymer binder such as polyurethanes, polyacrylates, or elastomers—is sprayed onto a carrier fabric and dried. U.S. Pat. No. 4,904,343 (Giglia et al.) describes a wet-laid process in which a water suspension of activated carbon particles and fibrillated acrylic fibers are used to make a permeable fabric. Other examples of articles using active particles are described in U.S. Pat. Nos. 5,124,177 (Kasmark, Jr. et al.), 4,510,193 (Blücher et al.) and 4,296,166 (Ogino).

U.S. Pat. No. 4,000,236 (Redfarn et al.) describes a method of forming a conglomerated, bonded, and preferably molded mass of particles of activated carbon bonded together by a polymer, e.g., a water soluble hydroxy propyl methyl cellulose or water insoluble polyvinyl formal. The polymer is rendered adhesive by permeating a random and loose mass of the carbon particles with a solvent (e.g., water) that is subsequently drained off.

U.S. Pat. No. 4,220,553 (Krause) describes a method of producing a porous block for filtering and drying refrigerant fluids. The method involves molding into a block a mixture of solutions of phenolic resin binder and polyurethane resin binder and an activated adsorbent, passing an alkaline gas through the block to cure the resins, purging the gas by passing air through the block, and heating the block to drive off solvents for the binders.

Small polymeric particles suspended in an aqueous medium can be prepared by suspension polymerization. (*Kirk-Othmer Encyclopedia of Chemical Technology*, Third Edition, John Wiley & Sons, Inc., 1982, Vol. 18, pp. 742–743.) The particles produced by suspension polymerization are generally on the order of approximately 0.1–1 mm in diameter. U.S. Pat. Nos. 3,691,140 (Silver), 4,166, 152 (Baker et al.), 4,786,696 (Bohnel), 5,045,569 (Delgado), 4,833,179 (Young et al.), 4,952,650 (Young et al.), 5,292, 844 (Young et al.), and 5,374,698 (Young et al.) and published PCT patent application WO94/13751 describe particles of inherently tacky or pressure-sensitive adhesive acrylate polymer produced by a suspension polymerization process.

This invention, in one aspect, provides a permeable, self-supporting, shaped structure that can be used—for example, as a filter, mask, or respirator for filtration of gases or vapors, such as air—to remove undesired gaseous components therefrom. The structure comprises a mass or agglomeration of active (or functional) particulate—for example, sorbents such as activated carbon, silica gel, or alumina granules—bonded together with pressure-sensitive adhesive polymer microparticulate distributed in the mass of active particulate. Because the bonding is effected between particulates, namely, the active particulate and the adhesive microparticulate, the bonding is in the nature of spot bonding or point contact where the surfaces of the two particulates are very close to touching or contacting one another at spots or points rather than the bonding being a coating of adhesive on the active particulate. Thus, the surfaces of the bonded active particulate are significantly or essentially exposed or free of bonding adhesive particulate, and the exposed surfaces define most or essentially all of the open interstices in the composite structure that render it permeable. And the bonded structure is flexible (rather than rigid) and thus conformable, due to the viscoelastic or elastic nature of the bonding agent, that is, the PSA polymer. The PSA polymer microparticulate is preferably smaller in size than the active particulate and is preferably distributed or dispersed amongst the active particulate in a small amount sufficient to adhere them together in a unified, flexible, self-supporting, permeable, microporous, composite structure.

A preferred embodiment of the permeable structure of this invention is in the form of a flexible sheet comprising, consisting, or consisting essentially of an agglomeration of a mass of porous adsorbent granules, such as activated carbon or alumina, bonded together by solid PSA polymer microparticulate, such as pressure-sensitive adhesive, polyacrylate polymer, solid micro-beads, which can be in the shape of spheres. The flexible sheet can be formed into a folded or conformable cup-like shape that can be interposed between open or porous, nonwoven or woven, fibrous sheets and the assembly thus adapted to fit over the mouth and nose of a person and used, for example, as a half-mask filtering means or respirator for purifying workplace breathing air contaminated with gaseous hazardous or toxic substances, for example, benzene or toluene solvents. The flexible sheet also can be laminated to a reinforcing sheet, for example, a scrim of an open woven or nonwoven fabric, such as cheesecloth.

In another aspect, the invention includes a canister-type protective respirator that comprises, as the air-purifying filter, the above-described permeable structure in cylindrical, disc, or other shaped form, to provide respiratory protection for workers in workplaces containing hazardous gases or vapors.

In another aspect of this invention, a method of making a permeable structure is provided, where the method comprises the steps of mixing active particulate with PSA polymer microparticulate (preferably an aqueous dispersion thereof) and shaping (e.g., by molding the resulting mixture) and bonding (e.g., by heating or drying) the mixed particulates in a desired form, such as in sheet form for use as a half-mask respirator or in a cylindrical, disc, or other form for insertion into the canister of an air-purifying respirator, or for use as a filter in an air-purifying means such as a room or space air-purifier, or as an oil sorbent means in the form of rovings or booms used to clean up oil spills.

In another aspect, this invention provides a method of purifying a fluid to remove undesired components. The method comprises passing the fluid through the above-described permeable composite structure.

In a further aspect, this invention provides novel PSA acrylate polymer, or polyacrylate product, and microparticulate thereof, for example, in the form of beads, that are useful, for example, to bond particulate, such as microporous adsorbent, to form permeable, shaped structures thereof, and to methods of making and using said PSA polymer product, microparticulate, and dispersions. The novel polyacrylate polymer product comprises (a) suspension stabilizer modifier having a metal cation and (b) a copolymer having repeating units derived from acrylic acid ester of non-tertiary alcohol having 1 to 14 carbon atoms, polar monomer, and at least one of the following copolymerizable components: higher vinyl ester (such as vinyl neo-alkyl ester), styrene sulfonate salt, multi-vinyl monomer, and alkylene polyalkoxy sulfate. Also provided are PSA microparticulate or micro-beads (and aqueous suspensions thereof) of very fine size, namely, 1 to 100 µm, preferably 5 to 50 µm, of the novel polyacrylate, and methods of making such microparticulate or beads by suspension polymerization of the monomers and copolymerizable components.

Figure 1:
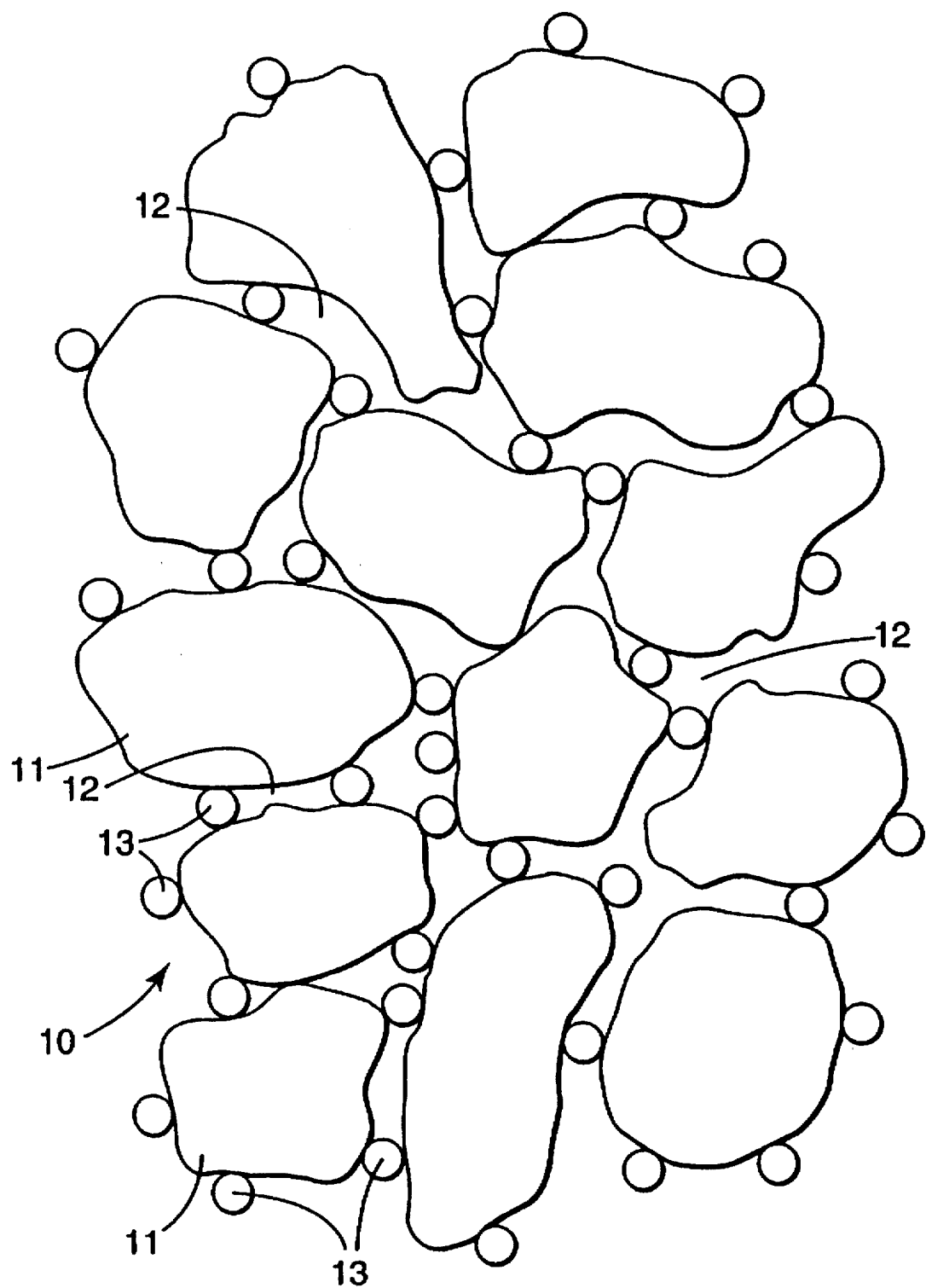
FIG. 1 is an illustrative, greatly enlarged, schematic, planar view of a representative portion of a permeable structure of this invention comprising a mass of active particles or granules bonded together by a plurality of smaller, uniformly distributed, PSA polymer microparticulate in the form of spherical beads.

In FIG. 1, a representative portion of an embodiment of a permeable structure of this invention is generally designated by reference number 10 and it comprises a permeable mass or aggregation of active (or functional) particles or granules 11, e.g., a sorbent such as active carbon particles, the surfaces of some of which are contiguous or in point contact while others are spaced-apart. Dispersed in the mass 10 and in interstices or spaces 12 between and defined in large part by the surfaces of granules 11 are PSA polymer microparticulate or microparticles 13 in the form of spherical beads that adhere to surfaces of a significant number of the granules and bond the granules together in spot or point contact, due to the inherent tacky and cohesive nature of the PSA polymer beads. The relative sizes and mounts of the granules 11 and PSA beads 13 and their distribution are such that the structure 10 is permeable to fluids and significant if not most (e.g., 75–99%) or essentially all of the surface area of the granules is exposed, that is, not covered by the PSA beads; thus, where the granules are absorbent or adsorbent, the sorptive capability of the granules is essentially retained. Though the granules 11 and PSA polymer beads 13 are shown in FIG. 1 with each having its generally uniform size and shape, the granules and/or PSA polymer microparticulate or beads can vary in size and shape.

Figure 2:
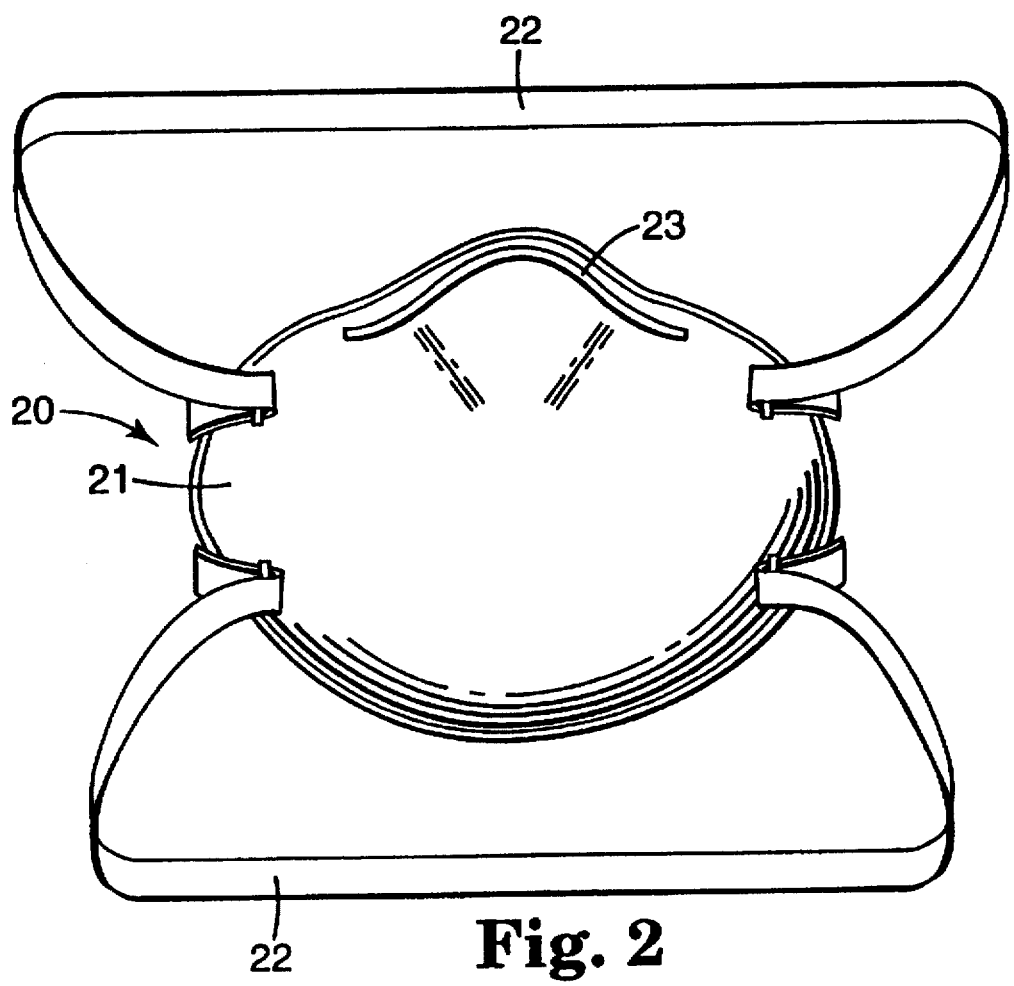
FIG. 2 is a front elevational view of a respirator half-mask of this invention, useful for removing undesired gaseous components from a gas such as air, the half-mask being in the form of a shaped laminate comprising conformable, open or porous, nonwoven, fibrous webs in which is interposed a permeable sheet structure a representative portion of which is shown in FIG. 1.
Figure 3:
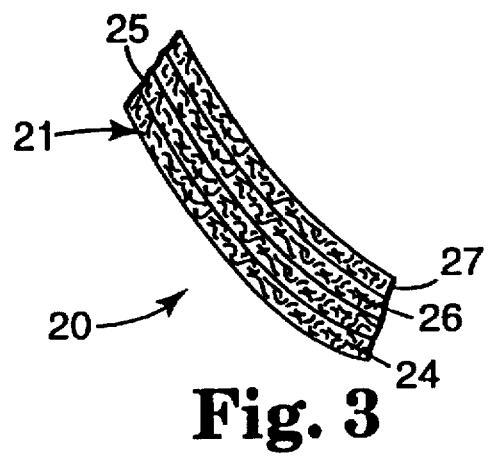
FIG. 3 is a cross-sectional view in elevation of a portion of the laminate of FIG. 2.

The illustrative face mask or respirator 20 of the invention shown in FIGS. 2 and 3 comprises a mask body 21 in the form era laminate and has elastic head bands 22 that are stapled or otherwise attached to the mask body for holding the mask over the nose, cheeks, mouth and chin of a person wearing the mask. A pliable, dead-soft band 23 of a metal, such as aluminum, allows the mask to be shaped and held in a desired fitting relationship over the nose of the wearer. The mask body 21 has a cup shape so that it stands out somewhat in spaced relation from a human face and makes a snug, low-pressure contact over the bridge of the nose, across the cheeks, over the mouth, and under the chin. The body 21 is sufficiently stiff to retain its shape and avoid collapse during an inhalation but also is flexible and resilient for comfortable fitting. As shown in FIG. 3, mask body 21 preferably comprises four layers, a first (upstream) shaping or cover layer 24, a gas filtration layer 25 of the permeable composite structure described below, a particle filtration layer 26 of a fibrous material, and a second shaping layer 27 that becomes placed next to the wearer's face when the respirator is worn. If desired, another particle filtration layer can be placed upstream from the gas filtration layer. Except for filtration layer 25, the mask 10 is described in U.S. Pat. No. 4,536,440 (Berg), which description is incorporated herein by reference. Said 3M Co. product bulletin 70-0701-5436-7(535)BE also describes such masks (some having exhalation valves), and their fibrous filter layers can be substituted by or used in combination with the filtration layer 25. Filtration layer 25 comprises a structure, such as illustrated in FIG. 1, comprising a composite of active particles, e.g., activated carbon, bonded together with PSA polymer microparticulate.

A composite structure of this invention can be made as a sheet by a wet-laid process similar to that used in the manufacture of paper. The sheet can be made by a process in which the first step is to mix an aqueous suspension or dispersion of PSA polymer microparticles with the active particles to form a uniform suspension or dispersion. This can be done on a small scale by weighing the ingredients into a container, filling the container with water, and shaking vigorously. Before it can settle, the suspension can be poured or cast into a reservoir of a paper hand-sheet molder or the like, where it is diluted and mixed further with water already in the molder, then drained through the molder's screen, which may or may not be covered with a scrim cloth material. The resulting wet, molded sheet can then be removed by hand from the molder's screen and dried with or without pressure. The dispersion can also be filtered through a carrier fabric, such as cheesecloth or the like, against a mesh screen. The resulting laminate of carrier fabric and composite sheet of particulate then can be removed from the screen and dried. The sheet thickness may be compressed to varying degrees before drying to control the composite sheet's permeability. The dispersion also may be cast in a mold, extruded, or otherwise shaped before drying. The composite sheet may be either removed from the carrier fabric or it may be used as a filter with the carrier fabric attached. If the composite structure has sufficient wet strength, no carrier fabric may be necessary, in which case the dispersion can be filtered directly through a mesh screen and the resulting particulate sheet removed from the molder's screen and dried. The composite structure's strength can be increased by mixing fibrous staple, such as rayon, with the particulate. On a large scale for making the composite structure as an endless web or continuous sheet, an aqueous suspension of PSA polymer microparticulate and active particulate can be pumped to the headbox of a fourdrinier type of paper-making machine from which the web can be withdrawn, dried, and cut into desired sizes.

Figure 4:
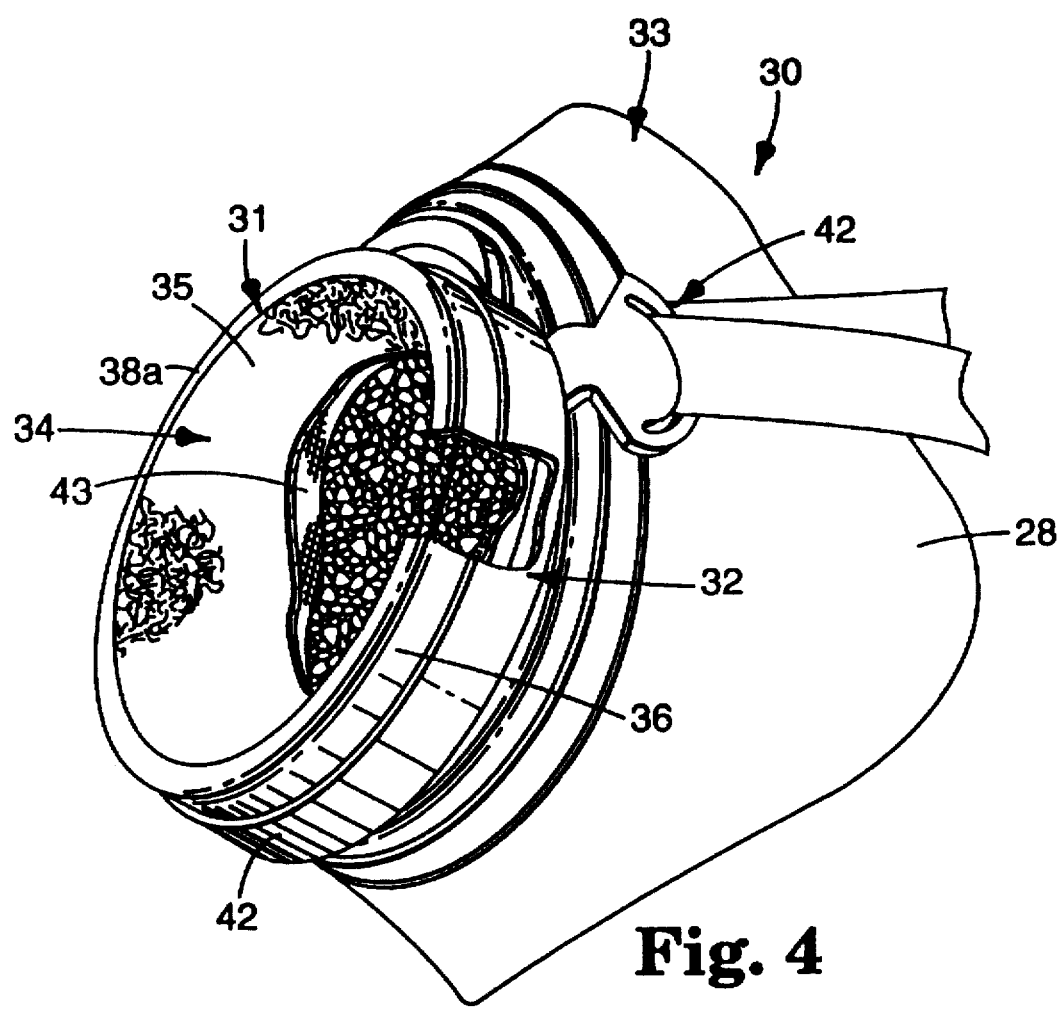
FIG. 4 is a front, elevational, isometric view in partial section of a cartridge respirator of this invention.
Figure 5:
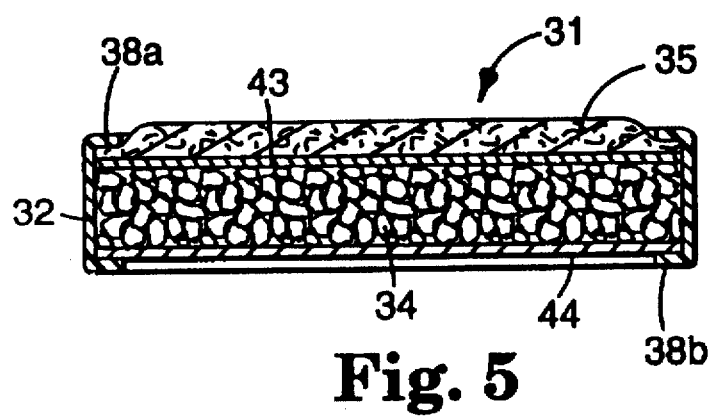
FIG. 5 is a cross-sectional view of the cartridge shown in FIG. 4.

In FIGS. 4 and 5, a respirator 30 is shown that includes a filter element 31, a filter element retainer 32, and a face piece 33. Filter element 31 includes a fluid-permeable disk-like structure or cartridge 34 of this invention comprising, for example, activated carbon bonded with PSA polymer micro-beads, and capable of removing gaseous contaminants from a fluid such as air, such structure being illustrated in FIG. 1. A fibrous filter 35 may be placed on the outer surface of filter element 31 to also remove particulates from the fluid. The outer peripheral member or ring 36 surrounds and seals the periphery of filter 35 and the peripheral surface of the permeable structure 34 and preferably includes inner upper and lower flanges 38a and 38b, respectively. Scrims 43 and 44 may be placed on the inflow and outflow faces of sorbent filter 34 to assist in retaining any loose unbonded particulate of the filter. The fibrous filter 35 may be, for example, a nonwoven web of electrically-charged microfibers, preferably melt-blown microfibers or a nonwoven web of electrically-charged fibrillated fibers.

Figure 6:
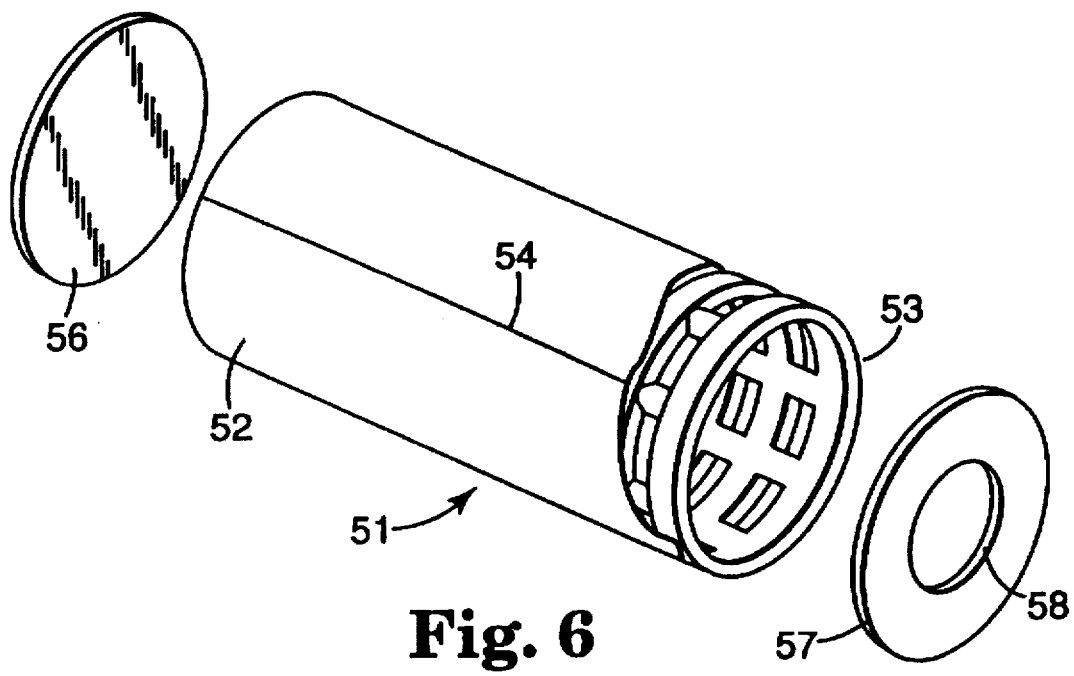
FIG. 6 is an exploded, isometric view, in partial section, of a permeable structure of this invention in the form of a sheet wrapped around a perforated tube, forming a tubular filter.

FIG. 6 depicts a permeable composite structure of this invention in the form of a cylinder 51 useful as a radial or tubular filter, for example, in a powered fan, air-purifying respirator. Cylinder 51 comprises a tubular member 52 made of a rectangular sheet that is wrapped in one layer or wrapped in a plurality of overlapping (e.g., 2–4) turns or layers around a perforated tubular support frame 53. As shown, the opposing edges of the wrapped sheet may abut and form a longitudinal seam 54 that can be sealed with a suitable adhesive. The tubular member 52 is closed with caps 56 and 57 in the form of thin circular disks that can be inserted in the ends of the tubular member and sealed in place with a suitable adhesive. End cap 57 is provided with a central opening 58 into which a suitable tube can be fitted to remove filtered fluid produced by externally passing a contaminated fluid feed through the tubular filter 51 from its environment. Alternatively, the fluid feed can be passed into the opening 58 and thence filtered as it passes through the filter 51 from the inside thereof.

The "active (or functional) particulate" that can be bonded with the PSA polymer microparticulate (the binder or binding agent of this invention) are particles or granules that are specially suited to perform some action or function attributable to some characteristic or property including chemical properties such as catalysis and ion exchange, and/or physical properties such as their high surface area, porosity, relativity small size, and shape. One subclass of such particulate materials is particles that interact with components in a fluid to remove or alter their composition. The components in the fluid may be sorbed onto or into the active particulate, or they may be reacted with a second component that may or may not be present on the activated particulate. Thus, the active particulate may be sorptive, catalytic, or reactive. Examples of active particulate materials are sorbent microparticulate or granules, such as activated carbon, chemically surface-treated activated carbon, alumina, silica gel, bentonite, kaolin, diatomaceous earth, powdered zeolites (both natural and synthetic), ion-exchange resins and molecular sieves, and non-adsorbent particulate, such as catalytic particles, and particles containing encapsulated drugs, fragrances, or flavors. Preferred particulates for acting as sorbents in an air-purifying system are activated carbon, chemically-treated carbon, and alumina adsorbent particulate. An example of commercially available activated carbon that can be used is sold under the trademark Kuraray, such as Kuraray GG or GC, which are described in product bulletin 8712-1000 of the Kuraray Carbon Co., Ltd. Other commercial products are CECAC-ARBON™ activated carbon products.

The "PSA polymer" is essentially any polymer, copolymer, or blend of polymer that has pressure-sensitive adhesive properties—that is, sufficient inherent tack, sufficient loss modulus, and sufficiently low glass transition temperature, to enable the polymer to form a firm bond with a substrate upon contact under light pressure, e.g., finger pressure, at the temperature of use (e.g., room temperature (23° C.)), and that can be made in the form of microparticulates. The polymer (dry) requires no activation by water, solvent, or heat in order for it to form such a bond. These PSA polymers as microparticulates (in dry form) adhere to the active particles, bonding them together at spot or point contact to make the unified, flexible, and self-supporting composite structure. The particulate form of the PSA enables it to bond to the active particles without flowing over them during preparation of the composite structure and coating the surfaces of the active particles. The particulate PSA, because of its inherent tack at room temperature, is not free-flowing at such temperature, and thus it is mixed with the mass of the active particulate by techniques that achieve the desired distribution.

PSA polymers that can be used in this invention include the natural rubber, styrene/butadiene copolymer, A-B-A block copolymers such as styrene-butadiene-styrene and styrene-isoprene-styrene block copolymers, butyl rubber, polyisoprene, and acrylic (or acrylate) PSA polymers described, for example, by Satas, D., ed., in *Handbook of Pressure Sensitive Adhesive Technology*, Van Nostrand Reinhold, 1989, pp. 261, 295, 317–320, 374–379, 396–402, and in *Kirk-Othmer Encyclopedia of Polyrmer Science and Engineering*, Vol. 13, 1988, pp. 345–346, which descriptions are incorporated herein by reference. Cryogenic processing of the PSA, such as that cryogenic grinding and disintegration described, for example in *Ullmann's Encyc. of Indus. Chem.*, 5th Ed., Vol. 17, 1991, pp. 467–468 VCH Publishers, New York, N.Y., may be necessary to render it in microparticulate size and for mixing the PSA with the active particulate since a PSA is inherently tacky and difficult to handle without self-agglomerating. PSA bonding agents of this invention that are inherently tacky or pressure-sensitive adhesive acrylate polymer microspheres or beads and aqueous suspensions thereof can be prepared by suspension polymerization and used as an aqueous suspension as described in U.S. Pat. Nos. 3,691,140 (Silver), 4,166,152 (Baker et al.), 4,786,696 (Bohnel), 5,045,569 (Delgado), 4,833,179 (Young et al.), 5,292,844 (Young et al.), 4,952, 650 (Young et al.), and 5,374,698 (Young et al.), and published PCT patent application WO94/13751, which descriptions are wholly incorporated herein by reference.

A preferred suspension polymerization process for manufacturing the pressure-sensitive acrylate copolymer microparticulate may be carried out as described in the Young et al. patents. This process comprises polymerizing an aqueous reaction mixture comprising copolymerizable vinyl or ethylenically-unsaturated monomers and adjuvants necessary for free-radical polymerization of the monomers to produce an aqueous suspension or dispersion of the microparticulate with the desired size and pressure-sensitive adhesive properties, and then collecting or recovering the resulting product suspension, for example, by gravity filtration and washing. Alternatively, the product suspension can be used as such (because of the inherent tackiness of the beads when dry) in making the permeable, shaped structure of this invention. The polymerization reaction mixture may comprise:

(i) an acrylic acid ester of a non-tertiary alcohol having 1 to 14 carbon atoms, or a mixture of such alcohols where the average number of carbon atoms of the alcohols in the mixture is about 4 to 12 (examples of the esters include isooctyl acrylate, dodecyl acrylate, isononyl acrylate, 2-ethylhexyl acrylate, and butyl acrylate);

(ii) polar monomer, such as acrylic acid, methacrylic acid, acrylamide, or N-vinylpyrrolidone;

(iii) optionally, vinyl acetate as described in said U.S. Pat. No. 5,292,844, but preferably a higher vinyl ester, e.g., of the formula $CH_2=CHOOCR$, where R is a straight or branched alkyl having at least 2 carbon atoms, e.g., 2 to 12 carbon atoms, such as propyl but preferably a neo-alkyl group, e.g., neodecyl, neononadecyl, etc., and where the homopolymer of such higher vinyl ester has a glass transition temperature of at least about −10° C., the simplest of such higher esters being vinyl pivalate, which higher vinyl esters can be used in place of the vinyl acetate used in the polymer formulation described in said U.S. Pat. No. 5,292, 844;

(iv) a chain transfer agent, such as a mercaptan, alcohol, or carbon tetrabromide;

(v) a free-radical initiator, such as 2,2'-azobisbutyronitrile;

(vi) an organic or inorganic suspending agent such as described in the Young et al. patents, for example, polyvinyl alcohol and hydrophilic silica;

(vii) a suspension stabilizer modifier having a metal cation, such as zinc acrylate, zinc methacrylate, or zinc oxide;

(viii) optionally, a macromolecular monomer, such as those described in U.S. Pat. No. 3,786,116, for example, poly(2-styrylethyl methacrylate);

(ix) optionally, a copolymedzable cross-linker, such as a photopolymerizable cross-linker, for example, an aromatic ketone, such as acryloxybenzophenone, or an ethylenically-unsaturated silane, such as a trialkyloxysilylalkyl(meth)acrylate, for example, acryloxypropyltriethoxysilane and methacryloxypropyl trimethoxysilane;

(x) optionally a copolymerizable multi- or di-vinyl monomer, such as 1,6-hexanediol diacrylate, divinylbenzene, or 1,4-butanediol diacrylate;

(xi) optionally, a surfactant, such as those described in said U.S. Pat. No. 5,374,698, for example, nonyl (or octyl) phenoxy poly(ethyleneoxy)ethanol, sodium dodecylbenzene sulfonate, sodium lauryl sulfate, or sodium lauryl ether sulfate or sulfonate or a copolymerizable surfactant such as α, β-ethylenically unsaturated poly(alkyleneoxy) sulfate (a commercially available product of which is that sold as Mazon SAM™ 211) and is described in U.S. Pat. No. 5,162,475, which description is incorporated herein by reference; and (xii) optionally, a copolymerizable styrene sulfonate salt.

Further details on the suspension polymerization method for the preparation of the acrylate polymer beads—such as preparing the polymerization reaction mixture by mixing a monomer-containing premix with an aqueous solution containing the suspending agent, or combining such premix with an aqueous solution of water-soluble comonomer and surfactant, or adding the suspension stabilizing modifier instead to the water phase, oil-in-water suspension, or the aqueous suspension of the copolymer beads, and the relative amounts of the particular monomers and other components of the polymerization reaction mixture and the polymerization reaction conditions—will be omitted for brevity, such details being described in the Young et al. patents. Generally, where the polymerization method is carried out in the preferred manner of mixing the premix and an aqueous solution comprising the suspending agent, the compositions of these materials are as set forth in the Table 1.

TABLE 1

| | Amt., parts per 100 parts of total monomers |
|---|---|
| Alkyl acrylate monomer | 70 to 98, preferably 80 to 97 |
| Polar monomer | 1 to 10, preferably 2 to 8 |
| Vinyl acetate monomer (where used) | 0.1 to 40, preferably 2 to 30 |
| Higher vinyl ester monomer (where used), such as vinyl pivalate | 0.1 to 40, preferably 2 to 30 |
| Suspension stabilizer modifier | 0.5 to 30, preferably 0.1 to 14 |
| Chain transfer agent | 0.01 to 0.5, preferably 0.03 to 0.1 |
| Free-radical initiator | 0.05 to 1, preferably 0.1 to 0.6 |
| Multi-vinyl monomer (where used) | 0.01 to 1, preferably 0.1 to 0.5 |
| Macromolecular monomer (where used) | 0.1 to 10, preferably 1.0 to 5.0 |
| Styrene sulfonate salt monomer (where used) | 3 to 10, preferably 4.0 to 8.0 |

The shape and size of the PSA microparticulate of this invention can vary, but generally the microparticulate is larger than 1 micrometer and less than 1000 to 2000 micrometers in size, that is, in diameter or in their largest dimension. Because their very fine or small shape and size cannot be readily discerned by the unaided eye but may be viewed with an optical microscope, they are called microparticulate.

The particle shape and size of the suspension polymerized PSA microparticles can be controlled by the polymerization process. Particle sizes exceeding 100 micrometers can be prepared by the suspension polymerization method described in U.S. Pat. Nos. 4,833,179 and 4,952,650. In that process, a surfactant with a concentration below the critical micelle concentration (CMC) is used in combination with an inorganic suspension agent for suspension stability. If the amount of surfactant used is above the CMC, the resulting bead suspension generally will be produced with undesirable emulsion particles, i.e., particles with diameters or size smaller than one micrometer.

In the present invention it has been found that PSA suspension beads with particle sizes from about 10 to about 100 micrometers can be prepared (without significantly forming emulsion particles) using a combination of surfactant and using, as another comonomer, a styrene sulfonate salt, such as the sodium salt, to control the particle size in the suspension polymerization. In this process, an amount of surfactant above the CMC can be used. The sodium salt can be used, for example, in the amount of about 3 to 10 parts by weight per 100 parts by weight of the total monomers used in the formulation polymerized by the suspension polymerization method. Generally, if the amount of the sodium salt is below 3 parts, emulsion particles (with a size less than 1 μm) will be produced and use thereof as a binder for sorbent particles will reduce the sorbency thereof. And if the amount of such sodium salt is greater than 10 parts, the resulting PSA polymer beads generally will be too stiff to effectively bond the active particles.

It has further been found that PSA suspension particles from about 1 to 10 micrometers in size can be achieved by homogenizing the polymerization reaction mixture comprising the styrene sulfonate salt and adding an amount of surfactant above the CMC to the aqueous solution before polymerizing by the suspension polymerization method. The homogenization results in a monomer droplet size below about 10 micrometers and may be carried out, for example, in a Waring™ blender.

If the active sorbent particle size is too small, the interstices or spacing between the particles (bonded with PSA microparticulate) generally will be too small for fluid to flow easily through the composite structure's interstices and the pressure drop across the structure may be undesirably high. On the other hand, if the particle size is too large, the PSA-bonded composite structure may have insufficient active particle surface area exposed to the fluid for good interaction between the active particle and the fluid environment. Generally, the diameter or size of the active particles can be as high as 1000 micrometers (μm) or higher, depending on the particular application of the composite structure. For many uses of the composite structures of this invention in which the fluid is a gas, active particles having a diameter or size of about 1 to 500 μm can be used and those of about 100 to 250 μm are preferred.

The optimum particle size of the PSA polymer microparticulate may depend in part on (i) the size of the active particles mixed therewith and (ii) the relative proportions of active particles and PSA polymer microparticulate used in making the composite structures. If the PSA polymer microparticulate is too large vis-a-vis that of the selected active particles to be mixed therewith, the PSA may cover too much of the surface of the active particles and undesirably reduce or block the activity or service life of the active particles or result in too few PSA particles available to adequately bond the composite structure. If the PSA polymer microparticulates are too small, a large number of them which are not involved in bonding the active particles together will adhere to the active particles, and may reduce activity thereof. To maximize the composite structure's activity, it has been found that the diameter or size of the active particles is preferably about 5 to 15 times larger, and more preferably about 10 to 12.5 times larger, than the diameter or size of the PSA polymer microparticulate. Thus, when the fluid treated with the sorbent composite structure is a gas, and the diameter or size of the active particles is 100 to 250 micrometers, the preferred diameter or size of the PSA polymer microparticulate in the structure generally is about 8 to 25 micrometers.

If the proportion of active sorbent particles in the composite structure is too high, the composite generally does not become adequately bonded. And if the proportion of active particles is too low, too much of the active surface becomes covered by PSA polymer particles and the composite structure may show relatively low activity. It has been found that a good balance of the properties of the composite structure, such as pressure drop, bond strength, and service life or activity, can be achieved when the proportion of active sorbent particles is 80–95% by weight of the composite structure and the proportion of PSA polymer microparticulate is 5–20% by weight of the composite structure.

Additives that may be used in the wet-laid process for making composite sheets of this invention include surfactants, dispersing agents, and other processing aids. It may be desired to add inorganic or organic, synthetic or natural fiber particulate (or chopped fiber), such as rayon staple, to the mixture of active particles and PSA polymer microparticulate to provide improved wet strength of the laid-up sheet. Additives also can be used to treat the surface of the active particles to increase their chemisorption of acidic or basic gases.

An important property of the composite structure of this invention in use is the pressure drop across it, which is dependent on permeability of the structure. As discussed above, the permeability of the structure is usually controlled by selection of the particle sizes of the active particles and the PSA bonding microparticulate. The pressure drop may also be controlled by processing variables, such as compressing the slurry of the active particles and PSA polymer particulate before drying the sheet thereof. Sheets of the composite structure have been made with a basis weight (BW) as low as 2 ounces of activated carbon per square yard (or about 64 g/m$^2$).

The composite structure's flexibility can be controlled by controlling the rheological properties of the PSA polymer microparticulate bonding agent. This can be accomplished by the desired combination of copolymerizable vinyl monomers that are used for polymerization to make up the suspension of PSA polymer microparticulate or beads. Increasing the proportion of the monomer that gives softer, tackier polymers with a lower glass transition temperature results in a PSA polymer product that can be used with the active particles to make more flexible composite structures. If the PSA polymer is too soft, however, it may tend to flow over the surface of the active particles mixed therewith and reduce the activity of the composite structure.

A preferred PSA polymer microparticulate bonding agent is one that is stiff enough to resist excessive flow over the surface of the active particles, yet soft enough to impart desired flexibility to the composite structure, and tacky enough to hold the structure together. Because of the viscoelastic property of the PSA polymer, some flow of the PSA can occur during composite preparation or during its useful lifetime. If the PSA polymer flows to cover too much of the surface of sorbent active particles, the useful sorbency activity of those particles can be reduced. The amount that the PSA flows may be a function of time, temperature, and the chemical composition of the adhesive. In order to resist PSA flow, several methods can be used to modify the viscoelastic properties of the PSA polymer, including chemical crosslinking, physical crosslinking, and polymer chain stiffening. To utilize chemical crosslinking, a modifying monomer, such as multi-vinyl monomer, e.g., 1,6-hexanediol diacrylate, 1,4-butanediol diacrylate, or divinyl benzene, can be included in an acrylate PSA monomer polymerization reaction mixture in order to form a crosslinked network that resists flow. The amount of such crosslinking monomer, e.g., 0.01 to 1 percent by weight, preferably 0.1 to 0.5 percent by weight, so used will determine the degree of crosslinking, which will determine the mount the PSA polymer will flow.

Physical crosslinks can be formed by including in the polymerization reaction mixture a macromolecular monomer that contains a chemical functional group that can create an associative affinity between these groups on different polymer chains. A class of modifying monomers that can be used in an acrylate PSA formulation to achieve such physical cross-linking is acrylate- or methacrylate-terminated, high glass-transition temperature macromonomer, which becomes part of the adhesive copolymer. A variety of useful macromolecular monomers that can be used and their preparation are described in U.S. Pat. No. 3,786,166 (incorporated here by reference). A commercially available macromolecular monomer that is particularly useful is 2-polystyrylethyl methacrylate sold under the trademark Chemlink™4500. It has a T$_g$ of about 90° C. or higher and a molecular weight of about 5000 to 25,000. The macromolecular monomer, if used, is typically used in the mount of about 0.1 to 10 parts per 100 parts of total monomers and is added to the monomer-containing premix of the polymerization reaction mixture.

Chain stiffening involves use of modifying monomers to raise the glass transition temperature of the PSA copolymer. Examples of acrylic monomers that may raise the glass transition temperature are methyl methacrylate, isobornylacrylate, methyl acrylate, and ethyl acrylate, etc., which are described by Satas, supra, pp. 306–307. Preferably, however, to obtain desired physical properties of the PSA polymer, the polymerizable monomers include the higher vinyl esters such as vinyl pivalate, vinyl neononanoate, vinyl neodecanoate, vinyl propionate, and vinyl 2-ethylhexanolate.

In using the above-described techniques to produce PSA polymer that resists flow, the mount of modifying monomer included in the polymerizable monomer mixture may vary with the composite structure's desired or expected maximum exposure temperature. PSA having an excessively high resistance to flow generally is not sufficiently tacky, and therefore may not be able to desirably bond the active particles. A higher exposure temperature generally requires greater resistance to flow, likely requiring some trade-off in adhesive bond strength, and therefore requiring more PSA to adequately bond the structure. An example of a preferred PSA microparticulate for bonding activated carbon of 100 to 250 μm for wet-laid sheets, dried at about 110° C., is the acrylic copolymer prepared by the polymerization method described in said Young et al. patents with 85 wt % of the copolymer derived from isooctyl acrylate, 10 wt % of the copolymer derived from vinyl pivalate, and 5 wt % of the copolymer derived from methacrylic acid. This copolymer is believed to be new per se, and in addition to using it (in the form of the aqueous product suspension thereof, the PSA beads of which preferably being 8 to 25 gm in size) as a binding agent for active particulate as described herein, it can also be extruded to form a continuous PSA film, for example, on a tape backing, like the applications described in U.S. Pat. No. 5,292,844.

Applications for the permeable composite structures of this invention having microporous adsorbent particles as the active particulate thereof include those applications where such particles are known to be useful in air and water purification systems, protective garments, deodorizing filters or garments, catalyst systems, and ion exchange systems. A particularly preferred application is to use the composite structures as sorbents to purify air in an air-purifying respirators. Some toxic gases or vapors for which these sorbent structures can be used include organic vapors, acid gases (including hydrogen chloride, sulfur dioxide, chlorine, hydrogen sulfide, and chlorine dioxide), ammonia, methyl amine, formaldehyde, mercury vapor, and radioiodine compounds.

EXAMPLES

Objects and advantages of this invention are illustrated or exemplified in the following examples. But the various substances and materials described in these examples, and the relative amounts, properties, dimensions, configurations, applications, and results set forth therein, should not be construed to unduly limit this invention.

Example 1–5

In each of five different runs, Examples 1–5. solid PSA acrylate copolymer micro-beads useful in accordance with this invention as a binder for active particles, such as activated carbon used in respirators, were prepared by using the preferred suspension polymerization process hereinabove described and using the technique generally described in said U.S. Pat. No. 4,536,440.

In each run, the suspension polymerization reaction was carried out in a 1-liter split-flask equipped with a condenser, thermometer, nitrogen inlet, motor-driven agitator, and a heating mantle with temperature control. The reaction flask was first charged with the ingredients of the aqueous dispersion listed in Table 2 and heated to 58° C. The batch of dispersion was maintained at this temperature with agitation and nitrogen-purging for 1 hour to remove oxygen from the flask. At this point, a premixed charge of the oil phase, listed in Table 2, was added to the flask while vigorous agitation (700 rpm) was maintained to obtain a good suspension. The ensuing polymerization reaction was continued with nitrogen purging throughout the polymerization. After exotherm, the reaction was continued at 75° C. for another 2 hours, and then the reaction mixture was cooled to room temperature. The size of the resulting beads of PSA polyacrylate polymer, useful as a binder of this invention, was measured and is also set forth in Table 2.

TABLE 2

| Ingredients, grams: | EXAMPLES | | | | |
|---|---|---|---|---|---|
| | 1 | 2 | 3 | 4 | 5 |
| Aqueous Dispersion: | | | | | |
| Water (deionized) | 610 | 610 | 695 | 610 | 610 |
| Methacrylic acid | 20 | 25 | 20 | 25 | 25 |
| Zinc oxide | 2.5 | 2.5 | 2.5 | 2.5 | 2.5 |
| Colloidal silica[a] | 4.4 | 2.5 | 4.4 | 2.5 | 2.5 |
| Sodium styrene sulfonate | 0 | 25 | 24 | 25 | 25 |
| Poly(alkyleneoxy) sulfate[b] | 0 | 0 | 3.1 | 0.32 | 1.1 |

TABLE 2-continued

| Ingredients, grams: | EXAMPLES | | | | |
|---|---|---|---|---|---|
| | 1 | 2 | 3 | 4 | 5 |
| Oil Phase: | | | | | |
| Isooctyl acrylate | 432 | 445 | 432 | 445 | 445 |
| Polystyryl macromer[c] | 13 | 0 | 13 | 0 | 0 |
| Vinyl acetate | 0 | 30 | 0 | 30 | 30 |
| Isooctyl thioglycolate | 0.25 | 0.46 | 0.25 | 0.46 | 0.46 |
| 2,2'-Azobisbutyronitrile[d] | 2.5 | 2.5 | 2.5 | 2.5 | 2.5 |
| Bead size, μm | 160 | 180 | 20 | 70 | 20 |

[a]Nalcoag ™ 1042 colloidal silica
[b]Mazon SAM ™ 211 surfactant, with a critical micelle conc. of 0.09% in deionized water
[c]Chemlink ™ 4500 polystyryl methacrylate macromer
[d]Vazo ™ 64 initiator The product of each run was a stable suspension of polymer beads. In a comparison run, like that of Example 1 but including in the aqueous dispersion the Mazon™ SAM 211 surfactant used in Example 3, the resulting beads coagulated.

As shown in Table 2, the sodium styrene sulfonate and the Mazon™ SAM 211 surfactant can be used in combination to obtain PSA microparticulate with a smaller particle size.

Examples 6–15

Ten runs, Examples 6–15, were carried out, using the procedure and equipment used in Examples 1–5, to produce batches of stable suspensions of solid polyacrylate PSA polymer beads of this invention (from monomers which included vinyl pivalate) which were about 20 μm in size and whose composition varied. The ingredients, and amounts thereof, used in making the batches of beads are set forth in Table 3.

TABLE 3

| | Examples | | | | | | | | | |
|---|---|---|---|---|---|---|---|---|---|---|
| | 6 | 7 | 8 | 9 | 10 | 11 | 12 | 13 | 14 | 15 |
| Ingredients, grams: | | | | | | | | | | |
| Aqueous dispersion: | | | | | | | | | | |
| Water (deionized) | 610 | 610 | 610 | 610 | 610 | 610 | 610 | 610 | 610 | 610 |
| Methacrylic acid | 25 | 25 | 25 | 25 | 25 | 25 | 25 | 25 | 25 | 25 |
| Zinc oxide | 2.5 | 2.5 | 2.5 | 2.5 | 2.5 | 2.5 | 2.5 | 2.5 | 2.5 | 2.5 |
| Colloidal silica[a] | 2.5 | 2.5 | 2.5 | 2.5 | 2.5 | 2.5 | 2.5 | 2.5 | 2.5 | 2.5 |
| Sodium styrene sulfonate | 25 | 25 | 25 | 25 | 25 | 25 | 25 | 25 | 25 | 25 |
| Poly(alkyleneoxy) sulfate[b] | 1.1 | 1.1 | 1.1 | 1.1 | 1.1 | 1.1 | 1.1 | 1.1 | 1.1 | 1.1 |
| Oil Phase, grams: | | | | | | | | | | |
| Isooctyl acrylate | 445 | 445 | 400 | 445 | 445 | 445 | 445 | 445 | 445 | 445 |
| Vinyl acetate | 0 | 0 | 0 | 30 | 30 | 30 | 30 | 30 | 30 | 30 |
| Vinyl pivalate[d] | 30 | 50 | 75 | 0 | 0 | 0 | 0 | 0 | 0 | 0 |
| Isooctyl thioglycolate | 0.46 | 0.46 | 0.46 | 0.46 | 0.46 | 0.46 | 0.46 | 0.46 | 0.46 | 0.46 |
| Acryloxy propyl triethoxy silane[e] | 0 | 0 | 0 | 0 | 0.25 | 0.50 | 0.75 | 0 | 0 | 0 |
| 1,6-Hexane diol diacrylate | 0 | 0 | 0 | 0 | 0 | 0 | 0 | 0.25 | 0.50 | 0.75 |
| 2,2'-Azobisbutyronitrile[c] | 2.5 | 2.5 | 2.5 | 2.5 | 2.5 | 2.5 | 2.5 | 2.5 | 2.5 | 2.5 |

[a]Nalcoag ™ 1042 colloidal silica
[b]Mazon SAM ™ 211 surfactant, with a critical micelle conc. of 0.09% in deionized water
[c]Vazo ™ 64 initiator
[d]Vynate ™ NEO-5 monomer
[e]Silane ™ A174 modifier Examples 16 and 17

Relatively smaller solid PSA polymer beads, namely, beads having a size of about 7 μm, were prepared using a styrene sulfonate salt as a comonomer and different surfactants in amounts greater than the CMC, according to the procedure described below.

To prepare the suspension beads of Examples 16 and 17 using the ingredients listed in Table 4, first, the mixture of the oil phase and the aqueous dispersion was homogenized in a Waring™ blender to make an oil-in-water dispersion for polymerization. In each run, the suspension polymerization was then carried out in a 2-liter, split flask equipped with a condenser, thermometer, nitrogen inlet, motor-driven agitator, and a heating mantle with temperature control. The reaction flask was charged with the above homogenized dispersion and heated to 58° C. under vigorous agitation (700 rpm) and nitrogen purging. The batch was allowed to exotherm. After exotherm, the reaction mixture was held at 75° C. for another 2 hours and cooled down to room temperature to produce a stable suspension of the beads.

TABLE 4

| | Examples | |
|---|---|---|
| Ingredients, grams: | 16 | 17 |
| Aqueous dispersion: | | |
| Water (deionized) | 610 | 610 |
| Methacrylic acid | 25 | 25 |
| Zinc oxide | 2.5 | 2.5 |
| Colloidal silica[a] | 2.5 | 2.5 |
| Sodium styrene sulfonate | 25 | 25 |
| Poly(alkyleneoxy) sulfate[b] | 1.1 | 0 |
| Sodium dodecylbenzene sulfonate[d] | 0 | 1.1 |
| Oil Phase, grams: | | |
| Isooctyl acrylate | 445 | 445 |
| Vinyl acetate | 30 | 30 |
| Isooctyl thioglycolate | 0.46 | 0.46 |
| 2,2'-Azobisbutyronitrile[c] | 2.5 | 2.5 |

[a]Nalcoag ™ 1042 colloidal silica
[b]Mazon SAM ™ 211 surfactant, with a critical micelle conc. of 0.09% in deionized water
[c]Vazo ™ 64 initiator
[d]Siponate ™ DS-10 sodium dodecylbenzene sulfonate surfactant

Example 18

200 g of Kuraray™ GC activated carbon was mixed with 40 g of wet beads (85% solid) obtained from the suspension of PSA polymer beads prepared as described for Example 1. Water was added until the mixture was fluid enough to mix by shaking. Excess water was strained off after mixing. The mixture was then split into two equal portions. Each portion was manually spread onto a piece of cheesecloth in a pan (20 cm×30 cm). It was then covered with another layer of cheesecloth, smoothed, and slightly compressed by rolling to form a sheet approximately 0.18 inch (4.6 mm) thick. The sheets were then dried overnight in an oven at 110° C. The resultant permeable sorbent sheets comprising the PSA-bound carbon particles were flexible and could easily be rolled up into a cylinder.

Personal respirators, such as shown in FIG. 2, fitting over the nose and mouth of a wearer, were made from above-described sorbent sheets. Respirators were made containing one, two or three sheets of flexible sorbent sheets in a single respirator (each sheet weighing about 30 g). The three-layer constructions were then tested for respirator service life against a carbon tetrachloride challenge under standard NIOSH test conditions, 30 CFR 11.162.8, with an air flow of 64 liters per minute containing 1000 ppm CCl$_4$. Three samples of the constructions were tested, and the average of their service lives was 51.3 min. This average service life as well as the measured pressure drops of the samples of the constructions of 20 mm H$_2$O may be compared with NIOSH guidelines of a minimum service life of 50 min. with a pressure drop (measured at 85 liters/min.) of not more than 40 mm H$_2$O.

Example 19

Four sorbent sheets were prepared as described in Example 18 using the same PSA beads but using Kuraray™ GG activated carbon (16×35 mesh). The sheets were trimmed to 17.8 cm×30.5 cm size after drying. The short sides were then glued together with hot-melt adhesive to make a 71.1 cm long strip of material. This strip was then wound around a 4.4 cm diameter piece of slotted tubing. One end of the wound tubing was fitted with an aluminum disc cap which was sealed with epoxy adhesive. The other end had a sealed fitting but had a central opening allowing it to be attached to a test fixture. Such a permeable cylindrical structure is illustrated in FIG. 6. The pressure drop of the permeable structure at 85 l/min. was 3 mm water. The permeable structure was tested under the specified conditions for a powered air respirator with a tight-fitting face-piece. The service life of the permeable structure was 146 min. at 115 l/min.

Examples 20–23

A set of permeable, sorbent sheets of this invention were made by the wet laid process, generally described hereinbefore, using PSA polymer micro-beads having the composition of those of Example 3, but with various sizes (5, 20, and 100 µm), as binders for activated carbon particulate of two mesh sizes, 80×325 and 40×140 (100 and 250 µm). The activated carbon had a surface area of approximately 1200 m$^2$/g, pore volume of 0.72 cc/g, iodine number of 1200 mg/g, and equilibrium carbon tetrachloride adsorption of 60% by weight. The pressure drop (air flow resistance) of the sheets were measured (in a round test fixture, 5.5 in. (14 cm) in diameter) by directing a stream of air, flowing at a velocity of 3.5 cm/sec, through a sheet, and measuring the air pressure on both sides of the sheet to determine the difference or pressure drop. Service life was also determined, employing CCl$_4$ vapor as the penetrating vapor, which was mixed with air at 50% relative humidity and 25° C. to yield a 50 ppm CCl$_4$-air stream which was directed at a flow rate of 16 l/min. through a sheet's exposed area (67 cm$^2$) to yield a face velocity of 4 cm/sec. Service life was defined as the time for the CCl$_4$ concentration on the other side of the sheet to reach 10 ppm. Table 5 summarizes the results of Examples 20–23.

TABLE 5

| | EXAMPLES | | | |
|---|---|---|---|---|
| Sorbent Sheet Description: | 20 | 21 | 22 | 23 |
| Activated carbon size, µm | 250 | 100 | 250 | 100 |
| PSA bead size, µm | 20 | 20 | 20 | 20 |
| Amt. activated carbon, wt % | 90 | 90 | 95 | 95 |
| Activated carbon basis wt, g/m$^2$ | 115 | 115 | 115 | 15 |
| PSA-to-activated carbon particle number ratio | 115 | 7.3 | 55 | 305 |
| Activated carbon-to-PSA size ratio | 12.5 | 5 | 12.5 | 5 |
| Thickness, mm | 0.40 | 0.28 | 0.66 | 0.54 |
| Density, g/cm$^2$ | 0.32 | 0.46 | 0.13 | 0.14 |
| Pressure drop, mm/H$_2$O: | | | | |
| for 1 layer | 0.23 | 0.39 | 0.16 | 0.20 |
| for 2 layers | 0.49 | 1.35 | 0.35 | 0.96 |
| for 3 layers | 0.72 | 1.74 | 0.51 | 1.16 |
| for 4 layers | 0.98 | 2.70 | 0.70 | 1.42 |

TABLE 5-continued

| Sorbent Sheet Description: | EXAMPLES | | | |
|---|---|---|---|---|
| | 20 | 21 | 22 | 23 |
| Service life, min.: | | | | |
| for 1 layer | 3.4 | 4.9 | 5.0 | 4.4 |
| for 2 layers | 11.2 | 14.4 | 10.6 | 17.3 |
| for 3 layers | 19.3 | 24.8 | 22.3 | 23.9 |
| for 4 layers | 25.9 | 36.1 | 38.5 | 35.8 |

The data of Table 5 show that lower pressure drop across the sorbent sheet is achieved with activated carbon particles of larger size and/or use of less PSA. Similar composite sheets were also produced using PSA beads of 5 and 100 μm.

In sheets prepared with PSA beads of 100 μm at these same weight percent levels and activated carbon sizes, the carbon particles were not held well in place, presumably due to the large number ratio of carbon particles to PSA particles. Conversely, using the 5 μm PSA particles, the sorbent sheets were fairly weak and brittle, and sheet pieces flaked off like chipping paint. The data indicate that a good range for the size ratio of activated carbon particles-to-PSA beads was about 5 to 50, and especially the 5 to 12.5 range as given in these examples.

A plot of service life data versus pressure drop data of Examples 20–23 in Table 5 shows that activated carbon of smaller particle size leads to higher pressure drop in sorbent sheets of similar weight basis, but that particle size has less effect on service life, so that activated carbon of larger particle size has better performance as indicated by the ratio of service life (SL) to pressure drop (PD). Also, use of a smaller amount of PSA beads leads to higher performance (i.e., higher SL/PD ratio).

Examples 24–33

Another set of permeable sorbent sheets of this invention were also made by the wet laid process using the PSA polymer beads of Examples 6–15 for bonding activated carbon particles. These sheets were made using the same activated carbon as that used in Examples 20–23 of 250 μm size, and were made to have 230 g/m² carbon basis weight and 95% activated carbon by weight. The characteristics and properties of this set of sorbent sheets are set forth in Table 6.

The data of Table 6 show that the PSA formulation can be varied to reduce the amount of adhesive flow, thereby reducing the activated carbon coverage, and increasing composite efficiency. When the adhesive contained 10% Vynate Neo-5 monomer, the composite had over 85% better SL/PD and over 50% better SL/BW than similar sheets made using adhesive without Vynate Neo-5 monomer. Vynate Neo-5 monomer appears to stiffen the PSA polymer backbone to resist flow during sheet drying. The other PSA modifiers, Silane A174 and hexane diol diacrylate, form chemical crosslinks and thus appear to avoid flow of the adhesive. Among these crosslinkers, the silane had high SL/PD at 0.15 wt %. Combining 10 wt % Vynate Neo-5 monomer with 0.15 wt % hexane diol diacrylate did not result in any improvement over 10 wt % Vynate Neo-5 monomer by itself.

TABLE 6

| | Examples | | | | | | | | | |
|---|---|---|---|---|---|---|---|---|---|---|
| | 24 | 25 | 26 | 27 | 28 | 29 | 30 | 31 | 32 | 33 |
| PSA Beads: | | | | | | | | | | |
| Source example | 9 | 6 | 7 | 8 | 10 | 11 | 12 | 13 | 14 | 15 |
| Amt. Vynate NEO-5, wt % | 0 | 6 | 10 | 15 | 0 | 0 | 0 | 0 | 0 | 0 |
| Amt. Silane A 174, wt % | 0 | 0 | 0 | 0 | 0.05 | 0.10 | 0.15 | 0 | 0 | 0 |
| Amt. hexane diol diacrylate, wt % | 0 | 0 | 0 | 0 | 0 | 0 | 0 | 0.05 | 0.10 | 0.15 |
| Sheet: | | | | | | | | | | |
| Pressure drop, mm H₂O | 0.64 | 0.51 | 0.52 | 0.50 | 0.56 | 0.59 | 0.54 | 0.58 | 0.52 | 0.55 |
| Service life, min. | 22.5 | 26.0 | 34.2 | 23.2 | 23.6 | 16.7 | 27.6 | 17.0 | 13.9 | 22.1 |
| SL/PD | 35.1 | 51.0 | 65.8 | 46.4 | 42.1 | 28.3 | 51.1 | 29.3 | 26.7 | 40.2 |
| 10xSL/BW | 9.8 | 11.3 | 14.9 | 10.1 | 10.3 | 7.3 | 12.0 | 7.4 | 6.0 | 9.6 |

Examples 34, 35

A set of sorbent sheets of this invention was also made by the wet laid process using 20% by weight PSA beads of Example 1 as binder for alumina particles, viz., ground alumina (>93.5% Al₂O₃), average size about 250 μm, available from Rhone-Poulenc, Inc., as "Activated Alumina Grade D." The characteristics and properties of this further set of sorbent sheets are set forth in Table 7, the service lives of the sheet being measured by directing hydrogen fluoride vapor against the sheets, according to NIOSH test method described in 30 CFR 11.150. The sheets met the requirement of the NIOSH test.

TABLE 7

| | Examples | |
|---|---|---|
| | 34 | 35 |
| PSA bead size, μm | 100 | 20 |
| Amt. of alumina basic wt., g/m² | 325 | 325 |
| Sheet pressure drop, mm/H₂O | 1.35 | 5.96 |
| Sheet service life, double layer, min. | 42 | 101 |

Examples 36–38

A set of sorbent sheets was also made by the wet laid process using a mixture of 1.3 cm long, 1.5 denier, rayon fiber, PSA polymer beads of Example 1, and activated carbon of 250 μm size. The characteristics and properties of this further set of sorbent sheets are set forth in Table 8. Because of the addition of fibers in the composite, the sheets of these examples could be handled in the wet state without the need for a supporting scrim. By increasing fiber content, sheet density was reduced, but pressure drop remained constant.

TABLE 8

| | Example | | |
|---|---|---|---|
| | 36 | 37 | 38 |
| Amt. of activated carbon, g/m² | 160 | 160 | 160 |
| Amt. of activated carbon, wt % | 85 | 85 | 85 |
| Amt. of PSA beads, wt % | 5 | 7.5 | 10 |
| Amt of rayon fiber, wt % | 10 | 7.5 | 5 |
| Sheet thickness, mm | 0.75 | 0.71 | 0.62 |
| Sheet pressure drop, mm H₂O | 0.22 | 0.21 | 0.21 |
| Sheet density, g/cm³ | 0.25 | 0.27 | 0.31 |

Examples 39–43

Another set of sorbent sheets were made by the wet laid process using the PSA polymer beads of Example 7 and various amounts of activated carbon. The characteristics and properties of the sheet are set forth in Table 9.

TABLE 9

| | Examples | | | | |
|---|---|---|---|---|---|
| | 39 | 40 | 41 | 42 | 43 |
| Amt. of activated carbon, wt % | 90 | 90 | 95 | 95 | 92.5 |
| Activated carbon basis wt., g/m² | 115 | 230 | 115 | 230 | 172.5 |
| Sheet pressure drop, mm/H₂O | 0.14 | 0.39 | 0.14 | 0.40 | 0.30 |
| Sheet service life, min. | 9 | 35 | 7 | 45 | 29 |
| SL/PD | 65 | 90 | 51 | 113 | 97 |
| 100 × SL/BW | 8 | 15 | 6 | 20 | 17 |

The data in Table 9 show the superior service life and pressure drop characteristics obtained with the a particular combination of adhesive composition, adhesive particle size, activated carbon particle size, and process conditions. The sheets were very flexible, with Young's modulus of approximately 1000 Kpa, and thickness of 0.5 to 1.0 mm, and had enough physical integrity to allow folding without significant loss of carbon.

Example 44

A sorbent sheet of this invention was prepared using as the active particulate a clay sorbent used to sorb oil spills and sold as "Ultrasorb," an expanded calcined clay granular product. Two hundred (200) g of these clay granules were mixed with 947 g of water and 80 g an aqueous PSA bead dispersion (50% solids) prepared as described in Example 1. The resulting mixture was shaken to uniformly disperse the PSA beads. The mixture was then filtered to remove free water. The resulting wet slurry of mixed granules and PSA beads was then spread uniformly on a cheesecloth sheet placed in a rectangular glass tray. The tray was then placed in an oven at 110° C. and allowed to dry overnight. The net dry weight of the sheet was 233 g.

Samples of this sheet were tested for sorbency according to ASTM test F726. The resulting test data are listed in Table 10. A two-minute soak-two-minute drain sequence was used. Mineral oil was used as the liquid.

TABLE 10

| Sample | Dry weight of sheet, g | Amount of mineral oil sorbed, g | Sorbency ratio, g/g |
|---|---|---|---|
| 44a | 52.8 | 54.7 | 1.0 |
| 44b | 54.0 | 53.7 | 1.0 |

The data show that the sheet sorbs its own weight of oil. The sheet could be employed to sorb oil dripped from a parked car, for example, and be much more convenient to clean up than loose sorbent granules sprinkled on the oil spill.

Example 45

A suspension of PSA polymer beads was prepared as in Example 1 but the polymer repeating units consisted of 96% derived from isooctylacrylate and 4% derived from methacrylic acid to the polymerization reaction mixture methacrylic acid. In addition, 0.06% isooctylthioglycolate was added to the polymerization reaction mixture; this was done to make softer, more flexible beads. Also, 0.5% Santanox R tertiary phenol antioxidant was added. The resultant beads were about 100 microns in diameter. Kuraray™ GC activated carbon (250 g), 30×70 mesh was sequentially soaked in zinc acetate and potassium carbonate as described in Example 6 of U.S. Pat. No. 5,344,626 (Abler) incorporated here by reference. Fifty (50) grams of the wet PSA beads were added to the potassium carbonate soak. The mixture was stirred, filtered, and divided into two portions for drying. Sheets were prepared as in Example 18. A double layer of two sheets, weighing 62 g each, was tested against HCN under the conditions described in Abler. A service life of 101.5 min. was obtained for the double layer.

Example 46

One hundred gram of activated carbon was mixed with 20 g of an aqueous PSA bead dispersion (85 wt % non-volatile solids) prepared as in Example 1. Water was added to the mixture until it could be easily shaken and mixed. The resulting mixture was filtered through a cheesecloth and spread on a glass plate to dry overnight in an oven at 110° C. After drying, the resulting composite sheet was removed from the glass plate as a self-supporting sheet. The sheet (100 g) was broken into small pieces that were loaded into a cylindrical mold, 3 in.×2 in. (7.5 cm×5 cm), and compressed therein for 30 min. The resulting coherent cylinder of PSA-bonded activated carbon, and another cylinder made in the same way, were tested as organic vapor filters against CCl₄ according to NIOSH procedure 30 CFR 11.162.8. At 1000 ppm CCl₄ challenge at 32 liters/min., the two cylinders had service lives of about 160 min. The sorption data gave no indication of poor packing or channeling.

Various modifications and alterations of this invention may become apparent to those skilled in the art without departing from the scope and spirit of this invention.

What is claimed is:

1. A method of making pressure-sensitive adhesive polymer microparticulate comprising suspension polymerizing an aqueous mixture of a suspension stabilizer modifier having a metal cation, and comonomers comprising acrylic acid ester of a non-tertiary alcohol having 1 to 14 carbon atoms, a polar monomer, and a higher vinyl ester of the formula $CH_2$=CHOOCR where R is a straight or branched alkyl group having at least 2 carbon atoms.

2. The method according to claim 1 wherein the higher vinyl ester is vinyl pivalate.

3. The method of claim 1 wherein the aqueous mixture further includes a multi-vinyl monomer selected from the group consisting of 1,6-hexanediol diacrylate, 1,4-butanediol diacrylate, divinyl benzene, and combinations thereof.

4. A pressure-sensitive adhesive polyacrylate polymer microparticulate comprising (a) a suspension stabilizer modifier having a metal cation and (b) a copolymer prepared from an acrylic acid ester of a non-tertiary alcohol having 1 to 14 carbon atoms, a polar monomer, and a higher vinyl ester of the formula $CH_2=CHOOCR$ where R is a straight or branched alkyl group having at least 2 carbon atoms.

5. An aqueous dispersion of microparticulate of the product of claim 4.

6. The polymer product of claim 4 where the vinyl ester is vinyl pivalate.

7. Pressure-sensitive adhesive micro-beads comprising the polymer product of claim 4.

8. The polymer product of claim 4 in the form of micro-beads having a size of 1 to 1000 micrometers.

9. The pressure-sensitive adhesive of claim 4, wherein the copolymer is further prepared from a multi-vinyl monomer.

* * * * *

UNITED STATES PATENT AND TRADEMARK OFFICE
CERTIFICATE OF CORRECTION

PATENT NO. : 5,696,199
DATED : December 9, 1997
INVENTOR(S) : Raymond Senkus et al.

It is certified that error appears in the above-identified patent and that said Letters Patent is hereby corrected as shown below:

Col. 4, line 63, "era" should read --of a --.

Col. 20, line 21, "isooetylthioglycolate" should read -- isooctylthioglycolate--.

Signed and Sealed this

Third Day of March, 1998

Attest:

BRUCE LEHMAN

Attesting Officer

Commissioner of Patents and Trademarks